(12) United States Patent
Nakashima et al.

(10) Patent No.: US 7,456,896 B2
(45) Date of Patent: Nov. 25, 2008

(54) AUTOMATIC FOCUSING METHOD AND AUTOMATIC FOCUSING CAMERA

(75) Inventors: Toshiyuki Nakashima, Osaka (JP); Kazuyuki Inokuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 678 days.

(21) Appl. No.: 10/940,683

(22) Filed: Sep. 15, 2004

(65) Prior Publication Data

US 2005/0062872 A1  Mar. 24, 2005

(30) Foreign Application Priority Data

Sep. 19, 2003  (JP)  ............................. 2003-328339

(51) Int. Cl.
*G03B 13/00* (2006.01)
*H04N 5/232* (2006.01)

(52) U.S. Cl. ..................... 348/345; 348/349; 348/220.1

(58) Field of Classification Search .............. 348/220.1, 348/349, 345
See application file for complete search history.

(56) References Cited

U.S. PATENT DOCUMENTS

| | | | | |
|---|---|---|---|---|
| 5,668,597 A | * | 9/1997 | Parulski et al. | ............. 348/350 |
| 5,828,406 A | * | 10/1998 | Parulski et al. | ........... 348/220.1 |
| 6,593,964 B1 | * | 7/2003 | Sakurai | ...................... 348/279 |
| 6,747,808 B2 | * | 6/2004 | Voss et al. | .................. 359/698 |
| 6,906,751 B1 | * | 6/2005 | Norita et al. | ................. 348/349 |

(Continued)

FOREIGN PATENT DOCUMENTS

JP  6-245129  9/1994

(Continued)

OTHER PUBLICATIONS

Chinese Office Action, with English translation, issued in Chinese Patent Application No. CN 200410078059.9, mailed Nov. 30, 2007.

*Primary Examiner*—David L Ometz
*Assistant Examiner*—Pritham Prabhakher
(74) *Attorney, Agent, or Firm*—McDermott Will & Emery LLP

(57) ABSTRACT

To enable the recording of a high-quality motion image and enable the recording of a still image which is focused with high precision even when the still image is recorded during the recording of the motion image, a mixed image signal obtained by mixing image signals in a one-to-one correspondence with individual pixels is outputted from an image sensor when a specified operation for starting the recording of the motion image is performed so that relatively high-speed automatic focusing is performed based on the mixed image signal and a high-quality motion image is recorded. When a shutter switch is half-pressed, a thinned image signal for an image from which pixels in vertical directions have been thinned out is outputted from the image sensor so that relatively high-precision and high-speed automatic focusing is performed based on the thinned image signal. When the shutter switch is full-pressed, image signals for all the pixels are outputted from the image sensor so that a still image is recorded.

6 Claims, 8 Drawing Sheets

U.S. PATENT DOCUMENTS

| | | | |
|---|---|---|---|
| 6,963,388 B1 * | 11/2005 | Ohta | 348/349 |
| 6,972,799 B1 * | 12/2005 | Hashimoto | 348/350 |
| 7,057,657 B1 * | 6/2006 | Ishihara et al. | 348/312 |
| 7,262,793 B2 * | 8/2007 | Nakajima et al. | 348/220.1 |
| 7,274,399 B2 * | 9/2007 | Oda et al. | 348/315 |
| 2001/0028402 A1 * | 10/2001 | Sugimoto et al. | 348/345 |
| 2002/0021361 A1 * | 2/2002 | Kitajima et al. | 348/232 |
| 2002/0030749 A1 | 3/2002 | Nakamura et al. | |

FOREIGN PATENT DOCUMENTS

| | | | |
|---|---|---|---|
| JP | 2001296470 | * | 4/2000 |
| JP | 20022871375 | * | 3/2001 |
| JP | 2001-296470 | | 10/2001 |
| JP | 2002-281375 | | 9/2002 |
| JP | 2003-230054 A | | 8/2003 |

* cited by examiner

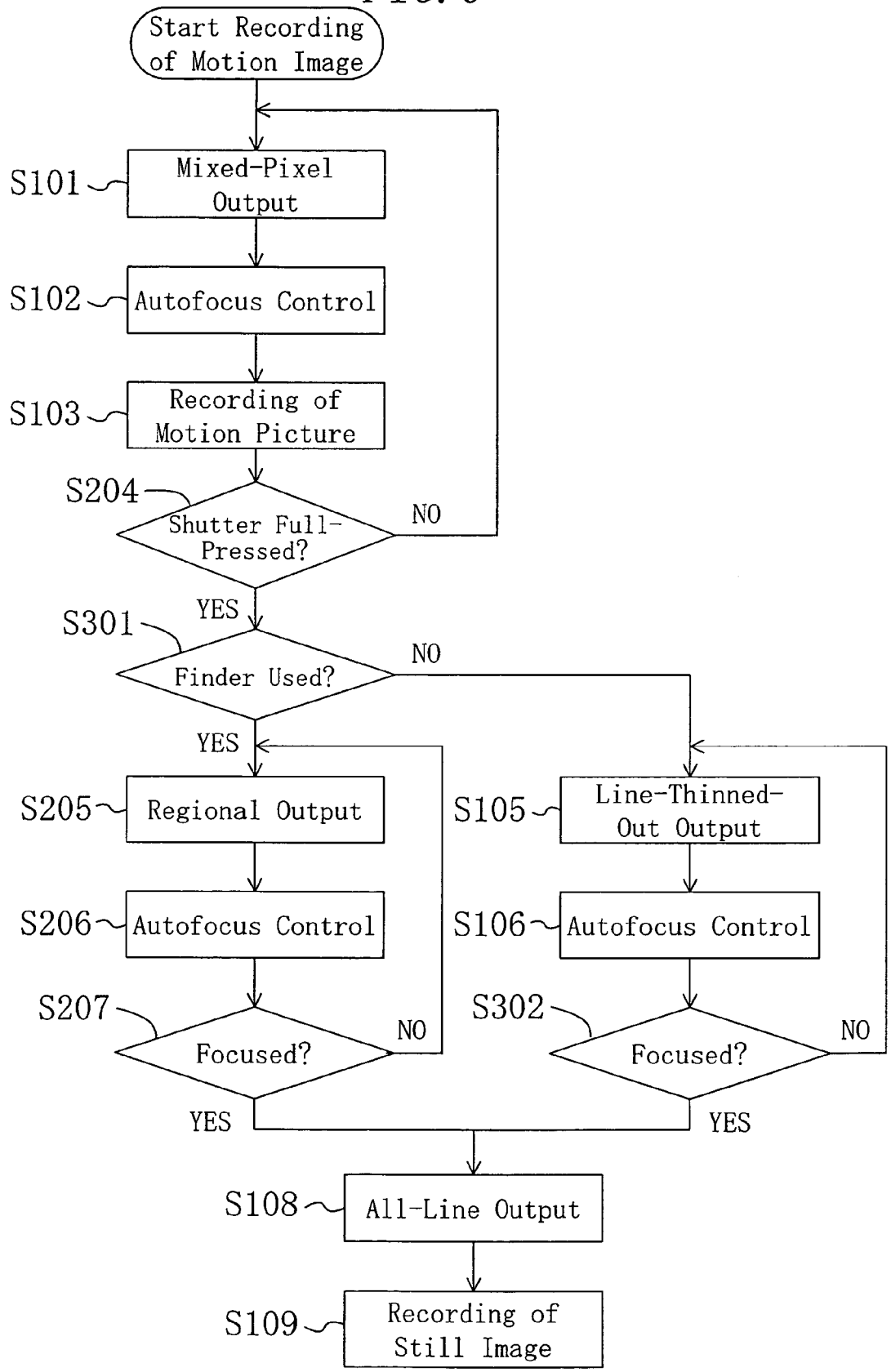

AUTOMATIC FOCUSING METHOD AND AUTOMATIC FOCUSING CAMERA

CROSS REFERENCE TO RELATED APPLICATION

This nonprovisional application claims priority under 35 U.S.C. § 119(a) on Patent Application No. 2003-328339 filed in Japan on 19 Sep. 2003, the entire contents of which are hereby incorporated by reference.

BACKGROUND OF THE INVENTION

The present invention relates to an automatic focusing camera for recording a motion image and a still image through automatic focusing and to an automatic focusing method used for such a camera.

A conventional digital camera capable of recording a motion image and a still image performs DCT (Discrete Cosine Transform) based on an image signal outputted from an image sensing device and performs automatic focusing such that a specified spatial frequency component is enhanced. More specifically, the DCT is performed on image signals for a plurality of frames, while shifting a focal position by driving a lens, and the lens is moved to a position at which, e.g., RF components are maximized (see, e.g., Japanese Laid-Open Patent Publication No. HEI 6-245129.

When the number of pixels composing one frame is increased, the time required for the reading of image signals from the image sensing device and the time required for the DCT are increased so that a time interval between the sensing of an image and the recording of a focused image tends to be longer. In view of the tendency, automatic focusing is performed based on a thinned image signal for an image from which pixels in, e.g., vertical directions have been thinned out and the foregoing thinned image signal is recorded for the recording of a motion image, while image signals for all the pixels are read out of the image sensing device in the state in which automatic focusing has been performed for the recording of a still image, by considering that the resolution of the motion image need not necessarily be the same as that of a still image.

When the pixels are thinned out as described above, however, the quality of the motion image is degraded since image information is basically missing. To prevent this, an improvement in the quality of a motion image may be considered by causing the image sensing device to output one mixed image signal obtained by mixing respective image signals for each specified number of pixels such that it is recorded. In this case, however, automatic focusing when a motion image is recorded is also performed based on the mixed image signal. In the automatic focusing based on the mixed image signal, however, it becomes difficult to record a still image which is focused with high precision when the recording of the still image is performed during the recording of a motion image. That is, since the mixed image signal includes image signals for all the pixels, while the mixing of the image signals lowers the RF components, high-precision automatic focusing suited to the recording of a still image cannot be performed.

Thus, the conventional automatic focusing camera encounters the problem that it is difficult to perform the recording of a still image which is automatically focused with high precision, while allowing the recording of a high-quality motion image.

SUMMARY OF THE INVENTION

In view of the foregoing, it is therefore an object of the present invention to enable the recording of a high-quality motion image and the recording of a still image which is focused with high precision even when the still image is recorded during the recording of the motion image.

To solve the foregoing problems, a first automatic focusing method according to the present invention is an automatic focusing method for a camera capable of recording a motion image based on an image signal outputted from an image sensing device and recording a still image during the recording of the motion image, the method comprising: performing automatic focusing for the recording of the motion image based on a mixed image signal obtained by mixing respective image signals for a plurality of pixels; and performing automatic focusing for the recording of the still image based on a thinned image signal for an image in which pixels are continued in either one of horizontal and vertical directions and from which pixels in the other direction have been thinned out or on a partial region image signal as an image signal for a partial region within an image sensing range.

In the arrangement, the mixed image signal is free of the missing of image information as observed in the thinned image signal so that the recording of a relatively high-quality motion image is performed. On the other hand, automatic focusing for the recording of the still image is performed based on the image signals for the pixels which are continued in either one of horizontal and vertical directions or on the image signal for the partial region so that, e.g., RF components are extracted properly and automatic focusing is performed with relatively high precision, while the pixels in the other of the horizontal and vertical directions have been thinned out or partially cut out of the image corresponding to the image signal. This allows the automatic focusing to be performed at a relatively high speed.

The mixed image signal and the thinned image signal or the partial region image signal may also be outputted from the image sensing device which performs the mixing of the image signals and the thinning or the cutting out of the partial region.

The arrangement not only allows a reduction in the time required for the extraction of the RF components of the image signals and the like but also achieves a reduction in the time required for the outputting of the image signals from the image sensing device so that prompt automatic focusing is performed.

The automatic focusing for the recording of the still image may be performed in response to a first shutter operation, e.g., a shutter half-press operation and the recording of the still image may be performed when a second shutter operation, e.g., a shutter full-press operation is performed or when the second shutter operation is performed and a focused state is reached through the automatic focusing in response to the first shutter operation.

Alternatively, the automatic focusing for the recording of the still image may also be performed in response to a shutter operation and the recording of the still image may also be performed when a focused state is reached through the automatic focusing.

The arrangement allows the recording of a still image by a simple and easy shutter operation and the recording of a positively focused still image.

A second automatic focusing method according to the present invention is an automatic focusing method for a camera capable of recording a motion image based on an image signal outputted from an image sensing device and recording a still image during the recording of the motion image, the method comprising: performing automatic focusing for the recording of the motion image based on a mixed image signal obtained by mixing respective image signals for a plurality of pixels; and performing automatic focusing for the recording of the still image based on a partial region image signal as an image signal for a partial region within an image sensing range when an optical finder is used or on a thinned image signal for an image in which pixels are continued in either one of horizontal and vertical directions and from which pixels in the other direction have been thinned out when the optical finder is not used.

If the finder is used in the arrangement, relatively high-speed and high-precision automatic focusing is performed based on a regional output and only the image of a partial region may be displayed on a monitor or the display may be halted appropriately because the user is not viewing the image displayed on the monitor. If the finder is not used in the arrangement, automatic focusing is performed based on the thinned image signal and the entire image sensing range is displayed on the monitor. This allows the user to recognize the image sensing range by using the monitor and easily record a still image.

The automatic focusing for each of the recording of the motion image and the recording of the still image may be performed based on the mixed image signal, the partial region image signal, or the thinned image signal each outputted from the image sensing device.

The arrangement not only allows a reduction in the time required for the extraction of the RF components of the image signals and the like but also achieves a reduction in the time required for the outputting of the image signals from the image sensing device so that prompt automatic focusing is performed.

The automatic focusing for the recording of the still image may be performed in response to a first shutter operation, e.g., a shutter half-press operation and the recording of the still image may be performed when a second shutter operation, e.g., a shutter full-press operation is performed or when the second shutter operation is performed and a focused state is reached through the automatic focusing in response to the first shutter operation.

Alternatively, the automatic focusing for the recording of the still image may also be performed in response to a shutter operation and the recording of the still image may also be performed when a focused state is reached through the automatic focusing.

The arrangement allows the recording of a still image by a simple and easy shutter operation and the recording of a positively focused still image.

A first automatic focusing camera according to the present invention is an automatic focusing camera capable of recording a motion image based on an image signal outputted from an image sensing device and recording a still image during the recording of the motion image, the camera comprising: motion-image-recording automatic focusing means for performing automatic focusing for the recording of the motion image based on a mixed image signal obtained by mixing respective image signals for a plurality of pixels; and still-image-recording automatic focusing means for performing automatic focusing for the recording of the still image based on a thinned image signal for an image in which pixels are continued in either one of horizontal and vertical directions and from which pixels in the other direction have been thinned out or on a partial region image signal as an image signal for a partial region within an image sensing range.

A second automatic focusing camera according to the present invention is an automatic focusing camera capable of recording a motion image based on an image signal outputted from an image sensing device and recording a still image during the recording of the motion image, the camera comprising: motion-image-recording automatic focusing means for performing automatic focusing for the recording of the motion image based on a mixed image signal obtained by mixing respective image signals for a plurality of pixels; finder-use sensing means for sensing whether or not an optical finder is being used; and still-image-recording automatic focusing means for performing automatic focusing for the recording of the still image based on a partial region image signal as an image signal for a partial region within an image sensing range when the use of the optical finder is sensed or on a thinned image signal for an image in which pixels are continued in either one of horizontal and vertical directions and from which pixels in the other direction have been thinned out when the use of the optical finder is not sensed.

In the arrangement also, the recording of a relatively high-quality motion image is performed, while the recording of a still image is performed through relatively high-precision and high-speed automatic focusing, according to the same mechanism as described above.

BRIEF DESCRIPTION OF THE DRAWINGS

FIG. 9 is a flow chart showing the operation of the automatic focusing camera according to EMBODIMENT 3.

DESCRIPTION OF THE PREFERRED EMBODIMENTS

Figure 1:
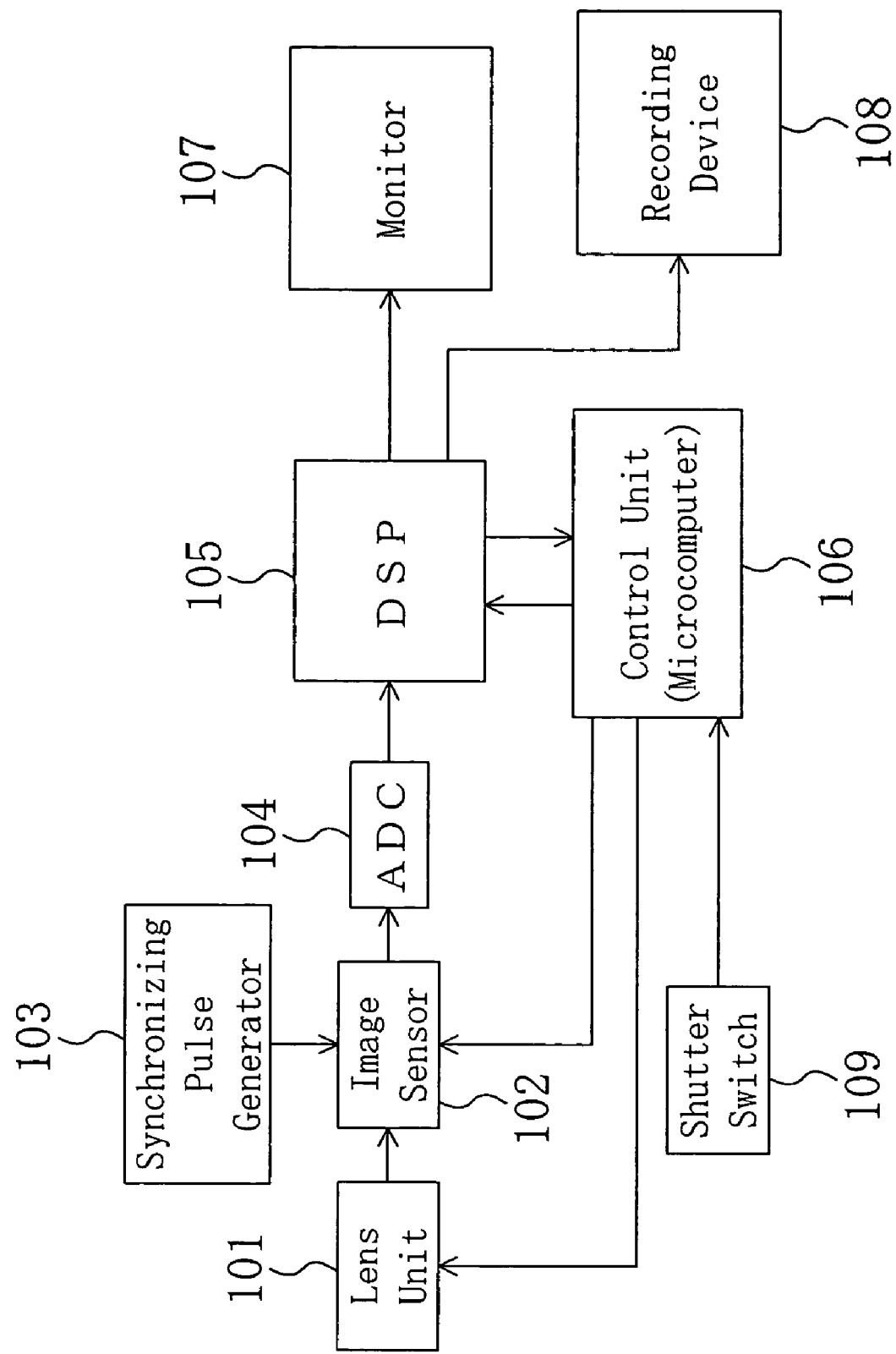
FIG. 1 is a block diagram showing a structure of a first automatic focusing camera according to EMBODIMENT 1.

Referring to the drawings, the embodiments of the present invention will be described herein below in detail.

Embodiment 1

-Structure of Automatic Focusing Camera-

FIG. 1 is a block diagram showing a structure of an automatic focusing camera according to EMBODIMENT 1. As shown in the drawing, the automatic focusing camera comprises: a lens unit 101; an image sensor 102; a synchronizing pulse generator 103; an ADC (AD Converter) 104, a DSP (Digital Signal Processor) 105; a control unit 106; a monitor 107; a recording device 108; and a shutter switch 109.

The lens unit 101 has an optical lens and a driver portion for moving the optical lens such that a focal position is adjusted under the control of the control unit 106.

The image sensor 102 is comprised of an image sensing device such as a CCD solid-state image sensing device or a MOS solid-state image sensing device, converts light incident via the lens unit 101 to an analog signal on a per pixel basis, and outputs an image signal in synchronization with a pulse inputted from the synchronizing pulse generator 103. The image sensor 102 not only outputs an image signal for each pixel but also outputs a mixed image signal for each given number of pixels, which is obtained by mixing image signals, and a thinned image signal from which pixels in, e.g., vertical directions in an image in a shot screen have been thinned out under the control of the control unit 106. The mixing of the image signals and the thinning will be described later in greater detail.

The ADC 104 converts the image signals outputted from the image sensor 102 to digital image data (AD conversion).

The DSP 105 extracts RF components by, e.g., the DCT based on image data inputted from the ADC 104 and outputs the extracted RF components to the control unit 106. The DSP 105 also converts image data outputted from the ADC 104 to image signals corresponding to the monitor 107 and outputs the image signals to the monitor 107, while converting the image data into, e.g., JPEG or MPEG format and outputs it to the recording device 108.

The control unit 106 is constructed by using, e.g., a microcomputer to control the operation of the entire automatic focusing camera. Specifically, the control unit 106 performs automatic focusing by, e.g., outputting an instruction on the output mode (mixed image signal or the like) of an image signal to the image sensor 102 or outputting a drive signal to the lens unit 101 to drive it such that the RF component of the image data outputted from the DSP 105 is maximized.

The monitor 107 is composed of, e.g., a liquid crystal display device to display a recorded image.

The recording device 108 records the image data outputted from the DSP 105 in a recording medium such as, e.g., a memory card.

The shutter switch 109 outputs signals responsive to two-step operations of, e.g., half-pressing and full-pressing to the control unit 106.

-Mixing of Image Signals and Thinning-

The following is an exemplary manner in which the mixing of the image signals and the thinning are performed specifically.

Figure 2:
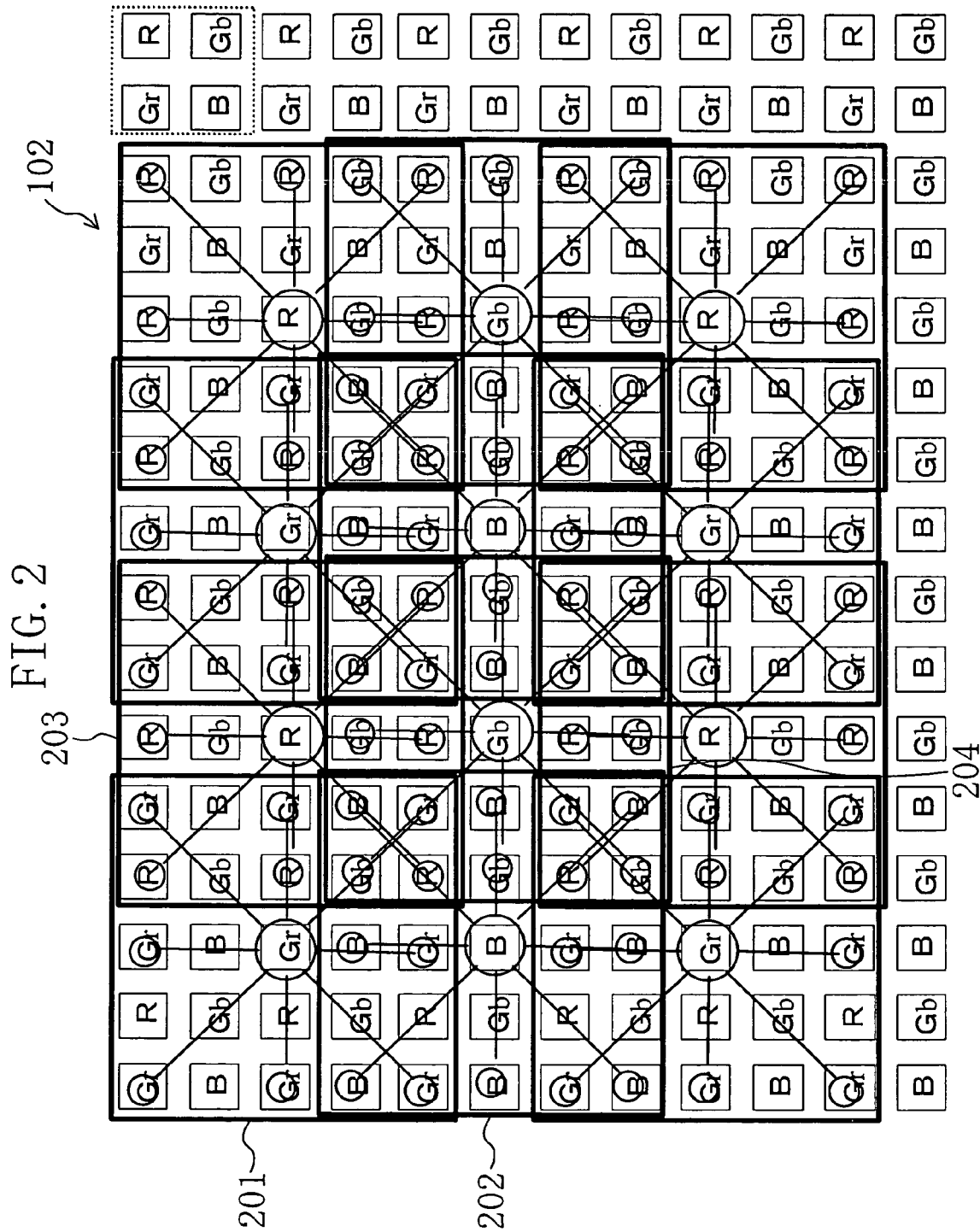
FIG. 2 is a view illustrating the arrangement of color pixels in an image sensor 102 according to EMBODIMENT 1.

FIG. 2 is a view illustrating the arrangement of color pixels in the image sensor 102. It is assumed herein that color filters attached to the front face of the image sensing device are in, e.g., the Bayer arrangement. Although Gr and Gb actually represent the same color, a filter pixel horizontally interposed between R filters on the both sides thereof is designated at Gr and a filter pixel horizontally interposed between B filters on the both sides thereof is designated at Gb for convenience of description.

Figure 3:
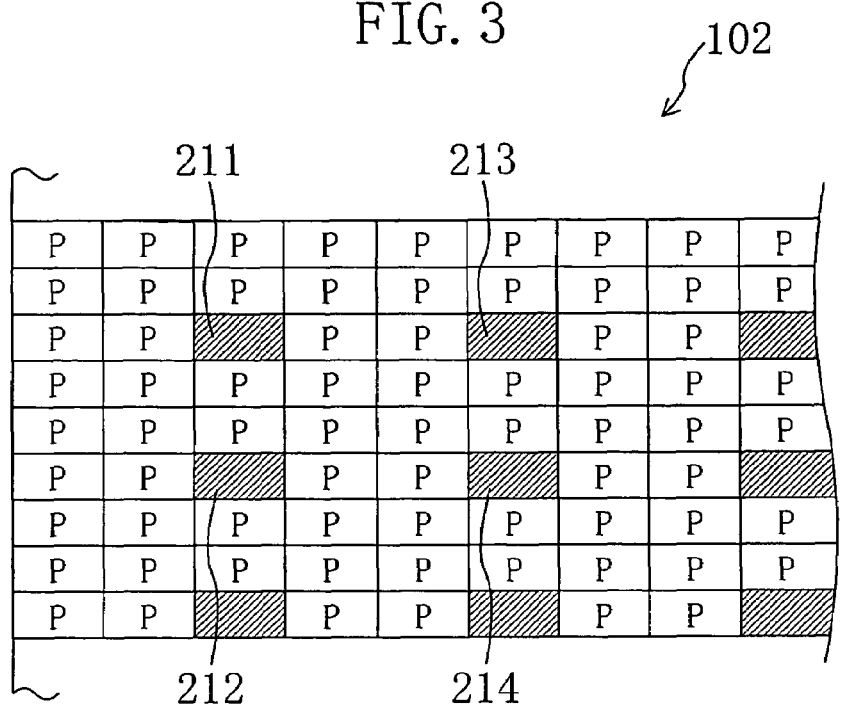
FIG. 3 is a view illustrating the arrangement of pixels for which image signals are outputted according to EMBODIMENT 1.

When a signal indicating the mixing of image signals is outputted from the control unit 106, respective image signals for the total of 9 pixels of Gr, B, Gb, or R (i.e., the center pixel and the surrounding 8 pixels) in each of mixed pixel unit areas 201 to 204 consisting of pixels of Gr, B, Gb, or R are mixed in the image sensor 102. As shown in, e.g., FIG. 3, each of the mixed image signals is outputted as an image signal for one of the pixels 211 to 214 located at the center of the corresponding one of the mixed pixel unit areas 201 to 204 from the image sensor 102 (In FIG. 3 and FIG. 4 which will be described herein below, each of the pixels is simply designated at P by omitting the distinction between the colors of the individual pixels).

Figure 4:
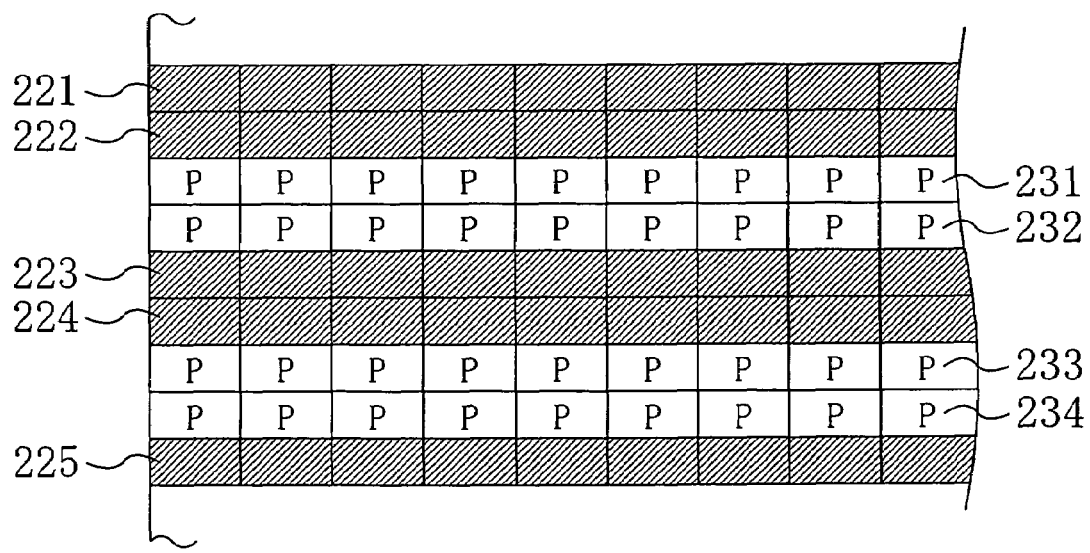
FIG. 4 is a view illustrating the arrangement of pixels to be thinned out according to EMBODIMENT 1.

When a signal indicating the thinning of an image signal is outputted from the control unit 106, pixels in the horizontal lines 231 to 234 are thinned out so that image signals for all the pixels in the lines 221 to 225 are outputted as shown in, e.g., FIG. 4. In short, half of the pixels in vertical directions are thinned out.

-Operation of Automatic Focusing Camera-

Figure 5:
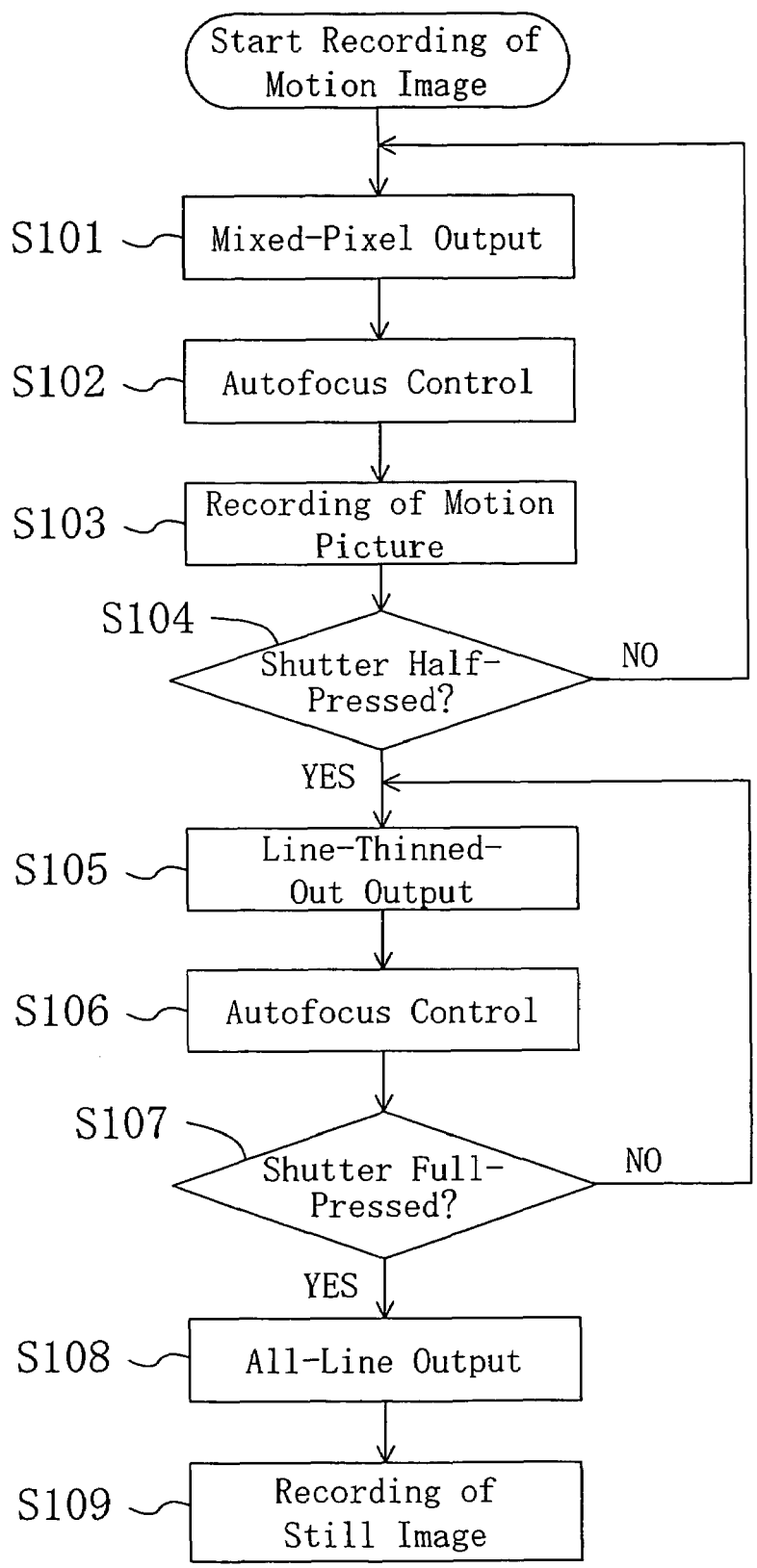
FIG. 5 is a flow chart showing the operation of the automatic focusing camera according to EMBODIMENT 1.

FIG. 5 is a flow chart showing the operation of the automatic focusing camera thus constructed.

(S101) When a specified operation for starting the recording of a motion image is performed first, the control unit 106 outputs a signal indicating the mixing of image signals to the image sensor 102 so that the mixed image signals each obtained by mixing 9 pixels in the same color belonging to the same unit area are outputted from the image sensor 102 as described above, while display is performed on the monitor 107.

(S102) Based on the image signals, automatic focusing is performed. Specifically, the image signals outputted from the image sensor 102 are converted to digital image data by the ADC 104 and RF components are extracted therefrom by the DSP 105 and inputted to the control unit 106. The control unit 106 performs automatic focusing such that the RF components are maximized, while outputting a drive signal to the lens unit 101 and thereby slightly moving the lens (more specifically, the outputting of the image signals in (S101) is repeatedly performed for the automatic focusing). Since each of the image signals outputted from the image sensor 102 is obtained by mixing 9 pixels in the same color belonging to the same unit area as described above, the time required for the outputting thereof and the time required for the extraction of the RF components are reduced so that high-speed automatic focusing is performed.

(S103) When a focused state is reached, image data subjected to A/D conversion from the signal which is outputted from the image sensor 102 at the time of reaching the focused state is converted to data in MPEG or like format and recorded in a recording medium by the recording device 108. The recorded image data has a reduced number of pixels as a result of the foregoing mixing but includes information on all the original pixels so that a motion image higher in quality than image data from which pixels have been thinned out is obtainable.

(S104) Thereafter, it is judged whether or not the shutter switch 109 has been half-pressed. If the half-pressing has not been performed (or if the operation of ending the recording of the motion image has not been performed), (S101) and the subsequent procedure described above are repeated and the recording of the motion image is sustained.

(S105) If the half-pressing of the shutter switch 109 is sensed in (S104), the control unit 106 outputs a signal indicating the thinning of an image signal to the image sensor 102, while the image signal for an image from which pixels in vertical directions have been thinned out as described above are outputted from the image sensor 102 and display is performed on the monitor 107.

(S106) Based on the image signals, automatic focusing is performed in the same manner as in (S102). In this case, since the image signal outputted from the image sensor 102 has been thinned as described above, the time required for the outputting thereof and the time required for the extraction of the RF components are shorter so that high-speed automatic focusing is performed. In addition, the RF components based on image data on pixels continued at least in horizontal directions are extracted so that automatic focusing is performed with relatively high precision.

(S107) Thereafter, it is judged whether or not the shutter switch 109 has been full-pressed. If full-pressing has not been performed, (S105) and the subsequent procedure described above are repeated so that the focused state for still image recording is sustained. Even when the shutter switch 109 has been full-pressed, if the focused state has not been reached, the automatic focusing operation may also be sustained appropriately. It is also possible to sense the full-pressing of the shutter switch 109 in (S104) described above and sense whether or not the focused state has been reached in (S107) such that the following recording of a still image is performed.

(S108) If the full-pressing of the shutter switch 109 is sensed in S107, on the other hand, the image sensor 102 outputs image signals for all the pixels in response to an instruction signal outputted from the control unit 106.

(S109) Then, image data on a still image based on the foregoing image signals for all the pixels is converted to data in, e.g., JPEG format by the DSP 105 and the data is recorded in a recording medium by the recording device 108.

Embodiment 2

Figure 6:
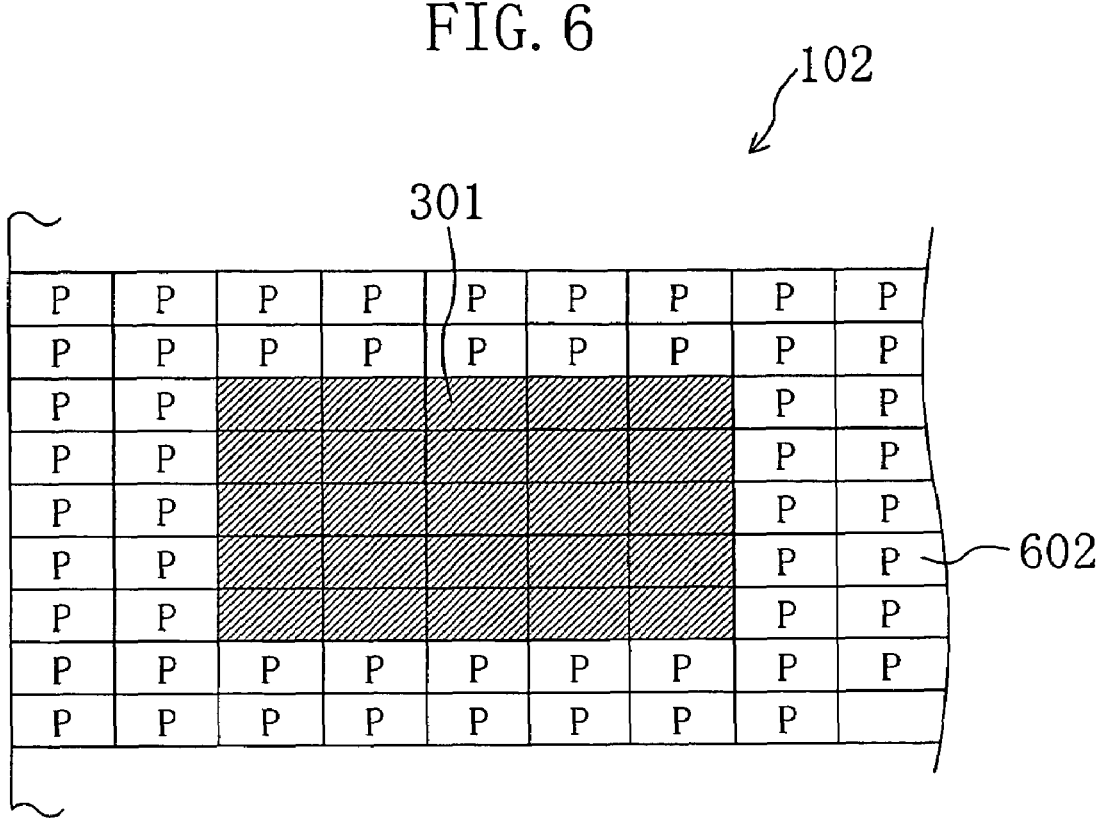
FIG. 6 is a view illustrating an example of a region for which image signals are outputted from the image sensor 102 according to EMBODIMENT 2.

When automatic focusing for still image recording is performed, the image sensor 102 may also be adapted to output image signals for a partial region 301, such as the center portion of a shot screen as shown in, e.g., FIG. 6, instead of the image signals for the image from which the pixels have been thinned out as described above. In this case, the image of the portion other than the region 301 is not displayed on the monitor 107 while automatic focusing for still image recording is performed. If the recording of a still image is allowed by, e.g., one-step operation of the shutter switch 109, however, the influence of display as described above can be reduced.

Figure 7:
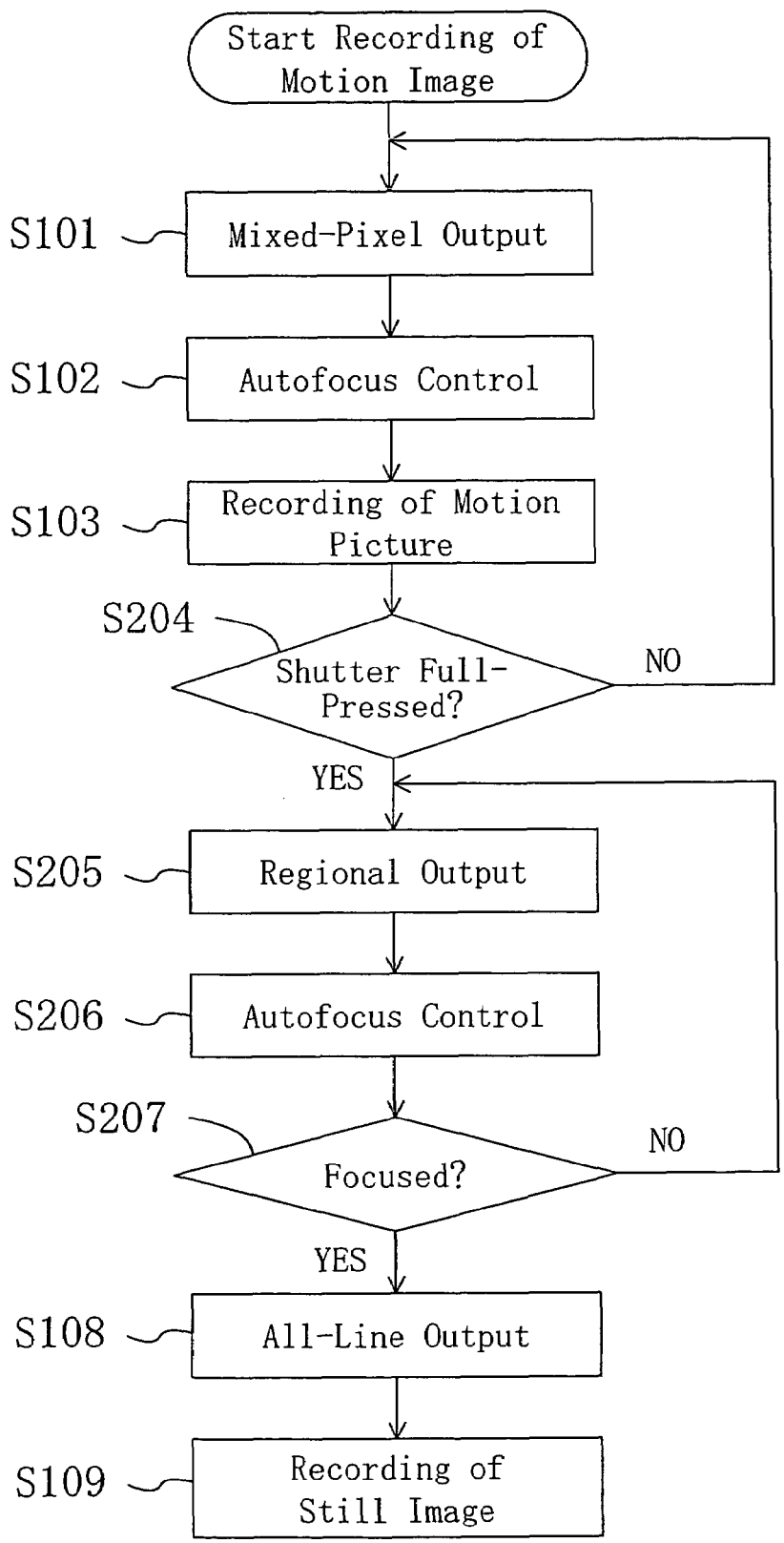
FIG. 7 is a flow chart showing the operation of an automatic focusing camera according to EMBODIMENT 2.

Specifically, it is also possible to perform the recording of a motion image through the procedure in (S101 to S103) in the same manner as in EMBODIMENT 1 (see FIG. 5), while performing automatic focusing for still image recording through a procedure in (S204 to S207) instead of the procedure in (S104 to S107), as shown in, e.g., FIG. 7. That is, it is judged in (S204) whether or not the shutter switch 109 has been full-pressed and, if the full-pressing has not been performed, the recording of the motion image is sustained. If the full-pressing has been performed (S205), on the other hand, the image signals for the region 301 are outputted from the image sensor 102 in response to an instruction from the control unit 106. In (S206), automatic focusing is performed in the same manner as described above in (S106) except that it is performed based on the image signals for the region 301. Thereafter, it is judged in (S207) whether or not a focused state has been reached and, when the focused state is reached, the recording of a still image is performed immediately in (S108 and S109).

As described above, even when automatic focusing for still image recording is performed based on the image signals for the partial region 301, RF components are extracted based on partial but continuous pixels so that automatic focusing is performed with relatively high precision. If the size of the region 301 is set properly, it is also possible to reduce the time required for automatic focusing and easily allow short-time recording of a still image (with substantially no time lag) after the shutter switch 109 is full-pressed.

Although it is generally preferred that the region 301 is formed of a plurality of pixels equidistant from the center of the image sensing range, it is not limited thereto. The size and location of the region 301 may be set appropriately depending on specifications required of the automatic focusing camera and the characteristics of the image sensor 102.

During the period during which automatic focusing for still image recording is performed, the display on the monitor 107 may be halted or, alternatively, the display based on the immediately preceding image data for motion image recording may be sustained appropriately.

The recording of a still image may also be performed appropriately when automatic focusing for still image recording is started by the half-pressing of the shutter switch 109 and a full-pressed state or a full-pressed and focused state is reached, in the same manner as in EMBODIMENT 1.

Embodiment 3

Figure 8:
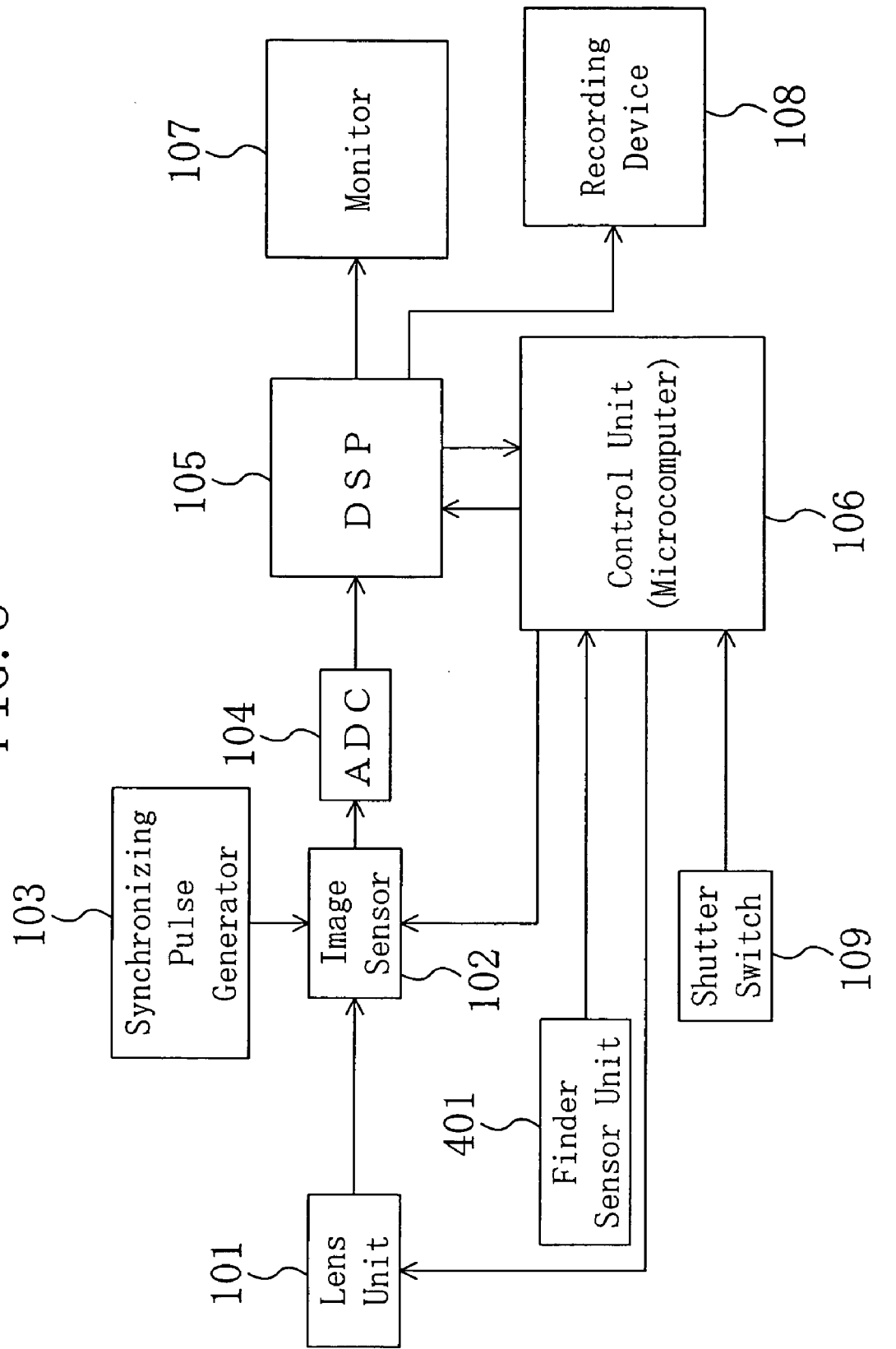
FIG. 8 is a block diagram showing a structure of an automatic focusing camera according to EMBODIMENT 3.

It is also possible to enable switching between automatic focusing for still image recording using a thinned output and automatic focusing for still image recording using a regional output as described in EMBODIMENTS 1 and 2 depending on whether or not the user is looking into an optical finder. That is, when a finder for allowing the user to view a subject via the lens unit 101 or an additional lens is provided, it is also possible to further provide a finder sensor unit 401 for sensing whether or not the user is looking into the finder as shown in FIG. 8 so that, if the finder is being used, the regional output is produced by the image sensor 102 and, if the finder is not being used, the thinned output is produced.

Specifically, the presence or absence of the use of the finder is judged between the sensing of the full-pressing of the shutter switch 109 (S204) and the outputting of the image signals for the region 301 from the image sensor 102 (S205) in EMBODIMENT 2 (see FIG. 7). If the finder is being used, automatic focusing based on the regional output and the recording of a still image are performed (S205 to S109). That is, if the finder is being used, only the image of the region 301 may be displayed appropriately on the monitor 107 (over the entire frame) or the display may also be halted appropriately because the user is not viewing the monitor 107 so that automatic focusing based on the regional output is performed successfully. If the finder is not being used, automatic focusing based on a line-thinned-out output is performed (S105 and S106) in the same manner as in EMBODIMENT 1 (see FIG. 5) and the recording of a still image is performed (S108 and S109) after a focused state is reached (S302). This is because, in this case, the user may be viewing the monitor 107 so that automatic focusing is performed in the state in which the entire sensing range is displayed.

Instead of sensing the full-pressing of the shutter switch 109 during the recording of a motion image as described above (S204), it is also possible to sense the half-pressing of the shutter switch 109 and, instead of judging whether or not a focused state has been reached during automatic focusing for still image recording (S207 and S302), it is also possible to sense the full-pressing of the shutter switch 109 or the full-pressing of the shutter switch 109 and a focused state in the same manner as in EMBODIMENT 1.

Although each of EMBODIMENTS 1 to 3 has shown an example in which image signals for 9 pixels are mixed as a mixed image signal, it is not limited thereto. The thinning is not limited to vertical ½ thinning. It is also possible to perform horizontal thinning or thinning at a ratio larger or smaller than ½.

Not only the recording of a still image during the recording of a motion image but also the recording of only a motion image in a motion image mode or the recording of only a still image in a still image mode may also be performed appropriately.

Thus, the automatic focusing method according to the present invention allows not only the recording of a high-quality motion image but also the recording of a still image which is focused with high precision even when the still image is recorded during the recording of the motion image so that it is useful when used in an automatic focusing camera for recording a motion image and a still image through automatic focusing and as an automatic focusing method used for such a camera or the like.

What is claimed is:

1. An automatic focusing method for a camera capable of recording a motion image based on an image signal outputted from an image sensing device and recording a still image during the recording of the motion image, the method comprising:

performing automatic focusing for the recording of the motion image based on a mixed image signal obtained by mixing respective image signals for a plurality of pixels; and performing automatic focusing for the recording of the still image based on a partial region image signal as an image signal for a partial region within an image sensing range when an optical finder is used or on a thinned image signal for an image in which pixels are continued in either one of horizontal and vertical directions and from which pixels in the other direction have been thinned out when the optical finder is not used.

2. The method of claim 1, wherein the automatic focusing for each of the recording of the motion image and the recording of the still image is performed based on the mixed image signal, the partial region image signal, or the thinned image signal each outputted from the image sensing device.

3. The method of claim 1, wherein
the automatic focusing for the recording of the still image is performed in response to a first shutter operation and
the recording of the still image is performed when a second shutter operation is performed or when the second shutter operation is performed and a focused state is reached through the automatic focusing in response to the first shutter operation.

4. The method of claim 3, wherein
the first shutter operation is a shutter half-press operation and
the second shutter operation is a shutter full-press operation.

5. The method of claim 1, wherein
the automatic focusing for the recording of the still image is performed in response to a shutter operation and
the recording of the still image is performed when a focused state is reached through the automatic focusing.

6. An automatic focusing camera capable of recording a motion image based on an image signal outputted from an image sensing device and recording a still image during the recording of the motion image, the camera comprising:

motion-image-recording automatic focusing means for performing automatic focusing for the recording of the motion image based on a mixed image signal obtained by mixing respective image signals for a plurality of pixels;

finder-use sensing means for sensing whether or not an optical finder is being used; and still-image-recording automatic focusing means for performing automatic focusing for the recording of the still image based on a partial region image signal as an image signal for a partial region within an image sensing range when the use of the optical finder is sensed or on a thinned image signal for an image in which pixels are continued in either one of horizontal and vertical directions and from which pixels in the other direction have been thinned out when the use of the optical finder is not sensed.

* * * * *